United States Patent [19]

Bernhard

[11] Patent Number: 5,394,975
[45] Date of Patent: Mar. 7, 1995

[54] TRANSPORT MECHANISM FOR MACHINES THAT PROCESS BOTTLES OR SIMILAR CONTAINERS

[75] Inventor: Herbert Bernhard, Wolfsheim, Germany

[73] Assignee: KHS Maschinen-und Analagenbau Aktiengesellschaft, Duisburg, Germany

[21] Appl. No.: 169,378

[22] Filed: Dec. 17, 1993

[30] Foreign Application Priority Data

Dec. 18, 1992 [DE] Germany ............... 42 42 925.0

[51] Int. Cl.$^6$ ............................................. B65G 29/00
[52] U.S. Cl. ................................................. 198/473.1
[58] Field of Search .................... 198/473.1, 803.11; 414/225; 901/1.6

[56] References Cited

U.S. PATENT DOCUMENTS 5,056,650 10/1991 Kronsedor ................ 198/473.1 X

FOREIGN PATENT DOCUMENTS 0316001 5/1989 European Pat. Off. .

*Primary Examiner*—Cheryl L. Gastineau
*Attorney, Agent, or Firm*—Robert W. Becker & Associates

[57] ABSTRACT

A transport mechanism for machines that process bottles or similar containers. To exchange the formatting elements, a gripping mechanism having at least one gripper head is provided. The gripping mechanism can be disposed on a machine frame or bedplate and is controlled by a control mechanism for a mechanical replacement of at least one formatting element that is held on a functional part and is made available on an apparatus for the supply and deposition of one or more formatting elements.

21 Claims, 2 Drawing Sheets

TRANSPORT MECHANISM FOR MACHINES THAT PROCESS BOTTLES OR SIMILAR CONTAINERS

BACKGROUND OF THE INVENTION

The present invention relates to a transport mechanism for machines that process bottles or similar containers. The transport mechanism has at least one container transporting zone provided on a machine frame or bedplate. At least a portion of the transporting zone is formed by at least one formatting element that is detachably held on a functional part of the transport mechanism at at least one fastening point by at least one fastening means.

For container or bottle processing or treating machines, for example for bottle filling machines and in this connection also where such machines are combined with a capping machine, transport mechanisms are customarily provided that have transporting zones which are at least partially formed by conveyor stars which are rotatably drive about vertical axes, and by pertaining curved guide means. In this connection, in particular the conveyor stars are adapted to the diameter of the container that is respectively to be handled. If one and the same container processing machine is to be used for handling containers having very different diameters, it is necessary to exchange the conveyor stars and possibly also other elements, for example the guide members that form the curved guide means, which elements are adapted to the respective container diameter. Within the context of the present invention, such elements will be designated generally as "formatting elements".

Up to now, the replacement of such formatting elements has been effected manually and is extremely time consuming and labor intensive, especially also in view of the fact that the formatting elements and in particular the conveyor stars are relatively heavy and when securing a formatting element on a functional part it is often very difficult to place the formatting element in the precise position that is required for the securement.

In order to facilitate the manual exchange of conveyor stars, it has already been proposed to secure the conveyor stars, or the outer star-like ring of such conveyor stars, to non-exchangeable flange plates of the transport mechanism with the aid of fastening means that are embodied as a rapid closure means (European Patent Application 0 316 001).

A "functional part" within the context of the present invention means an element on which a formatting element is detachably or exchangeably held. In the case of conveyor stars, the functional part is, for example, the drive or support shaft on which the conveyor star could be provided, or an appropriate flange plate on this shaft. In the case of formatting elements that are not moved, for example guide members or the like, the appropriate functional part is, for example, a holding or support element.

It is an object of the present invention to provide a transport mechanism where the exchange or replacement of formatting elements is considerably simplified.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
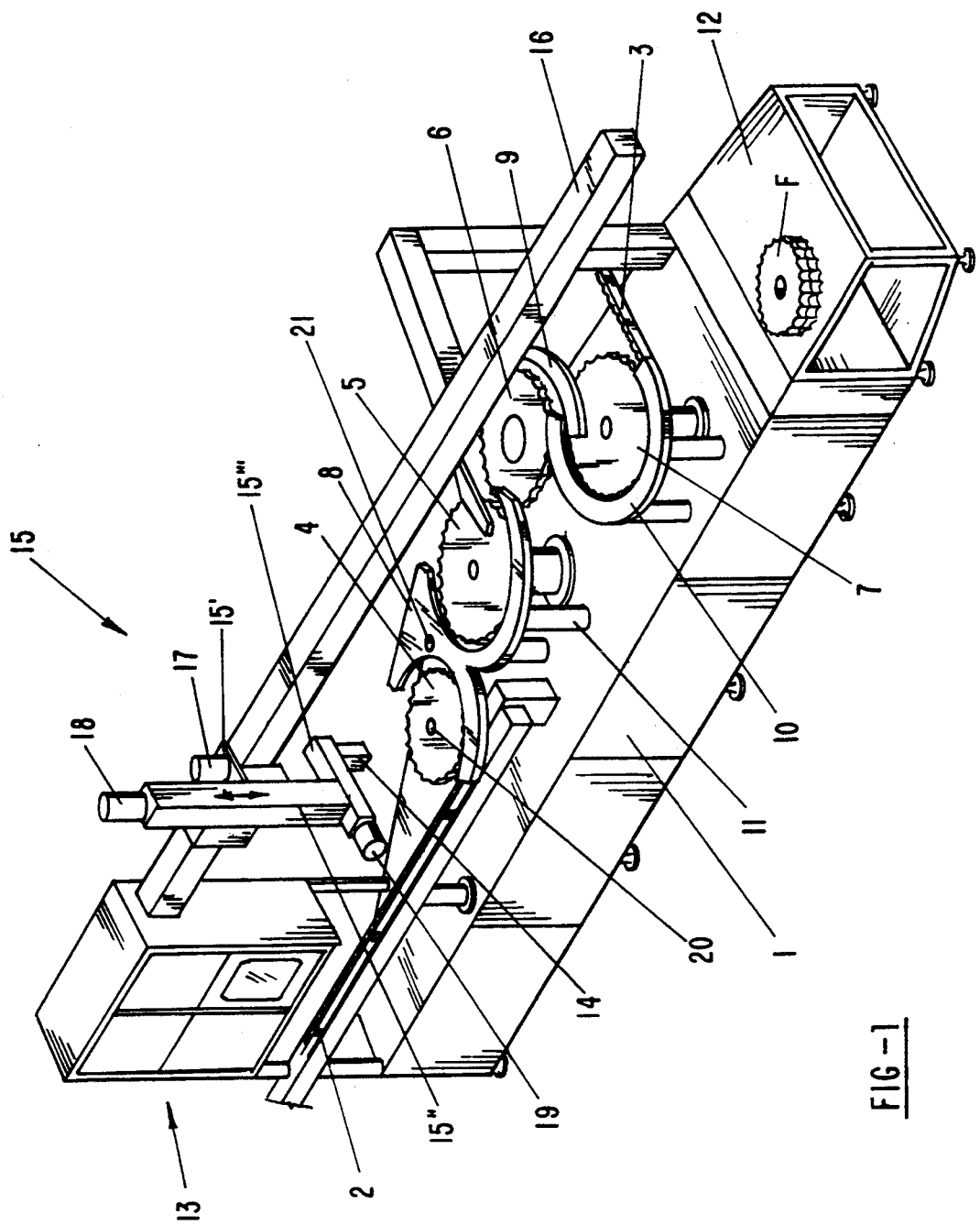
FIG. 1 is a simplified perspective view of one exemplary embodiment of the inventive transport mechanism.

The inventive transport mechanism is characterized primarily by: a gripping mechanism that is provided on the machine frame or bedplate and has at least one gripper head; a means for the deposition and supply of formatting elements; at least one drive means for moving the gripper head between the transporting zone and the means for the deposition and supply of formatting elements; means provided on the gripper head for grasping and holding formatting elements; means provided, for example, on the gripper head for disengaging and locking the at least one fastening means in a motorized manner; and a control mechanism for controlling the Gripping mechanism and the means for disengaging and locking in order to provide a mechanical exchange or replacement of the at least one formatting element that is held on a functional part with a formatting element that is available on the means for the deposition and supply of formatting elements.

With the aid of the gripping mechanism, i.e. its at least one gripper head, during exchange the formatting elements are automatically and mechanically removed from the respective functional part and are transported to the apparatus or means for deposition or storage and supply of formatting elements. From this apparatus new formatting elements that are present there are then grasped with the aid of the at least one gripper head and are transported to the respective functional part or the respective position, where the respectively new formatting element is then also mechanically secured by locking the fastening means.

The control of the movement of the gripper head that is necessary in this connection is effected by an electronic control mechanism, which effectively comprises a computer or microprocessor. The control mechanism is, for example, embodied in such a way that stored in a memory means of this control mechanism, among other things, are not only the positions at which the individual formatting elements are respectively to be secured when used on the transport mechanism, and in particular for example in the form of coordinates of a horizontal plane, but also to be stored in this memory means is which formatting element is respectively to be deposited at what location in the apparatus for the deposition and supply of the formatting elements. In this regard, the control can be such that each formatting element has fixedly associated therewith a particular location in this apparatus and/or in a stack of formatting elements formed in this apparatus, or that each formatting element delivered to the apparatus for the deposition and supply of formatting elements is deposited at an available free spot and this spot is stored in the memory means of the control mechanism for the pertaining formatting element.

The movement of the gripper head takes place, for example, in the three spatial or x, y, z axes, which extend at right angles to one another, or the movement of the gripper head also preferably includes a pivoting or rotational movement of this head about one of the spatial axes, preferably about the vertical or y axis.

The present invention has a particular advantage for machines that have a housing or protective means in that an exchange or replacement of formatting elements is convenient and in particular is possible even without opening such protective means.

Further specific features of the present invention will be described in detail subsequently.

DESCRIPTION OF PREFERRED EMBODIMENTS

Referring now to the drawing in detail, FIG. 1 shows a transport mechanism that has a machine frame or bedplate 1, on the upper side of which are provided two conveyor means 2 and 3, each of which is formed from a hinged band chain. The conveyor means 2 serves for supplying empty bottles, and the conveyor means 3 serves for withdrawing filled and capped bottles. The conveyor means 2, 3 are provided in addition to conveyor stars 4–7 that are each secured to a vertical shaft and are rotatably driven about the vertical axis of that shaft. Associated with the conveyor stars 4 and 5 is a guide member 8 that for each of these stars 4, 5 forms a respective curved Guide means. Similar curved guide means or guide members 9 and 10 are also provided for the conveyor stars 6 and 7. It is to be understood that each of the guide members 8, 9 and 10 is secured to the upper side of the bedplate 1, i.e. on support elements 11 that are fixedly provided at that location.

The conveyor star 4 forms the inlet or introduction star of a non-illustrated bottle filling machine. The conveyor star 5 is a transfer star between the filling machine and a subsequent closure or capping machine. The conveyor star 6 is part of this otherwise not illustrated capping machine. The conveyor star 7 forms the outlet or transfer star between the capping machine and the conveyor means 3. The conveyor stars 4–7 as well as the guide members 8–10 form formatting elements F.

As shown in FIG. 1, adjoining the forward, small side of the bedplate 1 is a receiving (loading) and supply table 12. Also shown in FIG. 1, in the vicinity of the rear, small end of the bedplate 1, and in particular above the conveyor means 2, is an electrical control mechanism 13 for the transport mechanism and for the system thereof for automatically or mechanically exchanging formatting elements F, with the control mechanism being accommodated in a control panel. Also disposed on the front side of the control panel, which is visible in FIG. 1, are the necessary actuating and input elements as well as indicators.

The system for exchanging the formatting elements F essentially comprises a gripper head 14 that is provided on a carriage arrangement 15. This carriage arrangement is movable along a horizontal guide 16 that extends over the entire length of the bedplate 1 or the transport mechanism all the way from the control panel 13 that accommodates the control mechanism 13 to over the loading and supply table 12, and in particular at a sufficient distance above the conveyor means 2 and 3 as well as the conveyor stars 4–7. Support means are provided on the bedplate 1 to hold the guide 16; the control panel can also be used to hold or support the guide 16.

The carriage arrangement 15, and along therewith the gripper head 14, can be moved in the longitudinal direction of the guide 16 by a first actuator or adjustment drive means 17. This drive means 17 is disposed on that part 15' of the carriage arrangement 15 that is guided directly on the guide 16. Adjustably guided on the part 15' in a vertical direction is a part 15" of the carriage arrangement 15, with this part 15" being adapted to be moved up or down in a vertical direction via a second actuator or adjustment drive means 18. At the lower end, the part 15", as a further part 15''' of the carriage arrangement 15, forms a horizontal guide having an axial direction that extends perpendicular to the longitudinal axis of the guide 16. The gripper head 14 is movable in the part 15''' with the aid of a third actuator or adjustment drive means 19. The drive means 17–19 are electric motors, for example stepping motors, that enable an exact control of the gripper head 14 in the aforementioned three spatial or x, y, z axes, and in particular in such a way that the positions or coordinates of the fastening points 20 of the conveyor stars 4, 5, 6 and 7 or the fastening points 21 of the guide members 8, 9 and 10, which positions or coordinates are, for example, held in a memory means of the electronic control mechanism 13, can, when the gripper head 14 is raised by the drive means 18, be exactly approached by the gripper head and then, by lowering of the gripper head with the aid of the drive means 18, can also be exactly found by the gripper head 14.

The underside of the gripper head 14 has three gripping jaws 22 that are distributed about a vertical gripper head axis GA and in the manner of a chuck can be moved radially outwardly or inwardly relative to this axis, and in particular via an electrical gripping or clamping drive that is provided in the gripper head and also has an electric motor. In the vicinity of the axis GA, the underside of the gripper head 14 has a connecting or coupling member 23 that is surrounded by the gripping Jaws 22 and in the illustrated embodiment is embodied as a hexagonal recess, the axis of which coincides with the axis GA. The coupling member 23 can be rotated about the axis GA by a rotational drive 24 that is also part of the gripper head 14.

Fastening of the formatting elements F is realized in that each formatting element F, i.e. the respective conveyor star 4, 5, 6 and 7 and/or the respective guide member 8, 9 and 10, has a fastening member in the form of a connecting bolt 25, which on the upper side of the formatting element F has a tapered sleeve 26 that increases in its cross-sectional area in an upward direction, in other words, as the distance from the formatting element F increases; following the tapered sleeve 26 in an upward direction, the connecting bolt 25 has a cooperating part 27 in the form of a hexagonal head. That end of the connecting bolt 25 that projects beyond the underside of the formatting element F is provided with a pin 28 that is disposed perpendicular to the axis of the connecting bolt and projects at both ends beyond the periphery of the bolt. This end of the connecting bolt 25 forms the inner portion of a bayonet-type or rapid coupling, the other part of which is embodied as a bayonet-type catch and socket-like receiving means 29. The receiving means 29 is provided on the respective shaft for the conveyor stars 4, 5, 6 and 7 or on a flange plate located there or on the respective support element 11 for the guide members 8, 9 and 10.

When the formatting element F is in a fastened state, the respective connecting bolt 25 is arrested or secured in the pertaining receiving means 29 via the pin 28. If this formatting element F is to be replaced or exchanged, the gripper head 14 is positioned over the appropriate fastening point 20 or 21, and in particular in such a way that the axis GA coincides as much as possible with the axis of the connecting bolt 25. Subsequently, with the gripping jaws 22 open, the gripper head 14 is lowered so that the cooperating part 27 enters the coupling member 23 and the tapered sleeve 26 is surrounded by the gripping jaws 22. The gripping Jaws are thereupon closed, and with the aid of the rotational drive 24 the connecting bolt 25 is rotated until the connection between the bolt 25 and the receiving means 29 is released. With the gripping jaws 22 still closed, the gripper head 14, and hence the formatting element F held thereby, are then raised and are transported to the loading and supply table 12.

The formatting element F is then placed on the table at a position provided therefor. Another formatting element F that is available on the loading and supply table 12 is then picked up at the tapered sleeve 26 thereof by the gripping jaws 22 and is transported with the aid of the carriage arrangement 15 to that position where the formatting element F that was to be replaced was previously removed; the new formatting element F is then secured at this position. Such fastening of the new formatting element F is effected by lowering the gripper head 14 and introducing the connecting bolt 25 into the appropriate receiving means 29, and then subsequently turning the connecting bolt 25 into the arresting or securing position with the aid of the rotational drive 24. The gripping jaws 22 are finally opened so that the gripper head 24 can be raised from the new or replacement formatting element F.

The relationship between the gripper head 14 and the carriage arrangement 15 during replacement of the formatting elements F can be accomplished in many different ways. For example, a formatting element that is to be replaced can be deposited upon the loading and supply table 12 in the aforementioned manner, a new formatting element can be taken therefrom and secured to the provided portion of the transport mechanism, all before the replacement of a further formatting element F is effected.

The system just described with the inventive gripper head 14 enables a completely automatic, mechanical exchange or replacement of the formatting elements F, for example when converting from one type of bottle to another type of bottle. In particular, the inventive system also enables a simple and convenient replacement of the formatting elements F for treatment or processing machines that have a housing or other protective means or cover, without having to open such protective means. Especially with respect to obtaining a high degree of freedom from bacteria, it is also possible, rather than freely storing the formatting elements F on the loading and supply table 12, to provide a closed storage means separate from the table in which the formatting elements F can be cleaned and/or sterilized after they have been introduced or deposited therein or prior to their respective removal.

Furthermore, it is also possible in principle to embody the carriage arrangement 15 in such a way that the gripper head 14 can also be pivotable about a vertical axis, for which purpose, for example, the part 15''' can be pivotably disposed on the part 15'' of the carriage arrangement 15.

Figure 2:
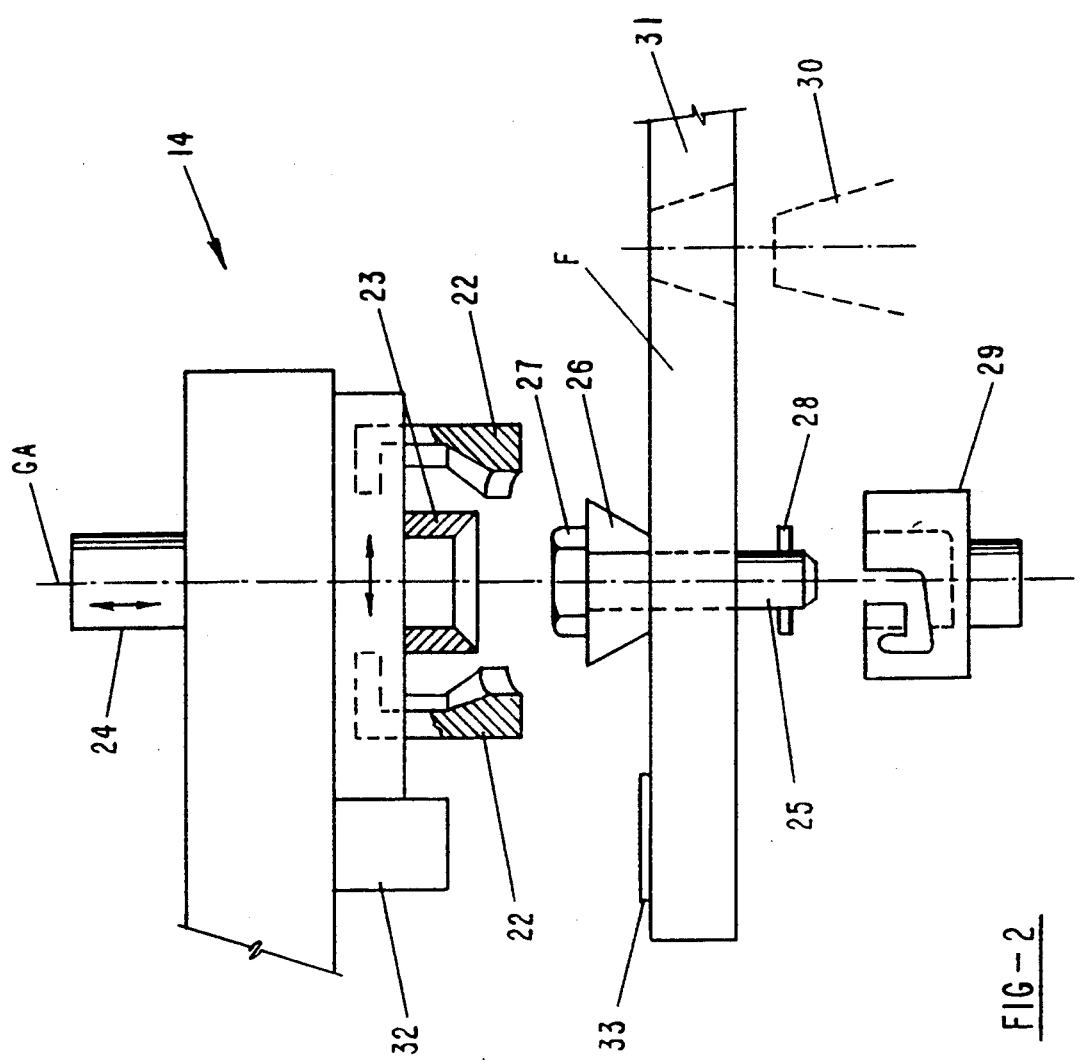
FIG. 2 is a simplified detailed view of the gripper head for detaching and replacing the formatting elements of the transport mechanism of FIG. 1, with the gripper head being shown together with a first coupling part that is provided on the formatting element and an associated second coupling part that is provided on the transport mechanism.

In addition, as shown in dashed lines in FIG. 2, a centering pin 30 can be provided on the respective functional element, with this pin 30 cooperating with a centering opening 31 for centering the formatting element F and also for the transfer of torque. Also indicated schematically in FIG. 2 by the reference numeral 32 is a scanning means, for example a light scanner, that is provided on the underside of the gripper head 14 and detects or scans a mark or similar indicator 33 that is provided on the upper side of the formatting element F, for example as a bar or line code that, for example, forms an identification for the pertaining formatting element. Such an identification can then be used to monitor or control a proper replacement and/or deposit and/or removal of the formatting element onto or from the loading and supply table 12.

The loading and supply table 12 can also be embodied as a cart or the like, with this cart as well as the bedplate 1 then having special means in order to be able to precisely position and hold the cart at the bedplate 1.

The present invention is, of course, in no way restricted to the specific disclosure of the specification and drawings, but also encompasses any modifications within the scope of the appended claims.

What I claim is:

1. A transport mechanism for machines that process containers, said transport mechanism having at least one container transporting zone provided on a bedplate, whereby at least a portion of said transporting zone is formed by at least one formatting element that is detachably held in a functional part of said transport mechanism at at least one fastening point by at least one fastening means, wherein the improvement comprises:
   a gripping mechanism that is provided on said bedplate and has at least one gripper head;
   a means for the deposition and supply of formatting elements;
   at least one drive means for moving said at least one gripper head between said transporting zone and said means for the deposition and supply of formatting elements;
   means provided on said gripper head for grasping and holding said formatting elements;
   means for disengaging and locking said at least one fastening means in a motorized manner; and
   a control mechanism for controlling said gripping mechanism and said means for disengaging and locking in order to provide a mechanical exchange of said at least one formatting element that is held on a functional part with a formatting element that is available on said means for the deposition and supply of formatting elements.

2. A transport mechanism according to claim 1, wherein said at least one gripper head is adapted to be raised to a position above said transporting zone and to be moved between said transporting zone and said means for the deposition and supply of formatting elements, and wherein said at least one gripper head is adapted to be lowered out of said raised position to said at least one fastening point of said at least one formatting element.

3. A transport mechanism according to claim 2, wherein said at least one gripper head is movable at least in a first, horizontal axis between said transporting zone and said means for the deposition and supply of formatting elements, and is movable in a second, vertical axis.

4. A transport mechanism according to claim 3, wherein said at least one gripper head is movable in a third, horizontal axis that extends perpendicular to said first and said second axes.

5. A transport mechanism according to claim 3, wherein said at least one gripper head is rotatable or pivotable about at least one axis.

6. A transport mechanism according to claim 5, wherein said at least one gripper head is rotatable or pivotable about said second, vertical axis.

7. A transport mechanism according to claim 1, wherein said means for disengaging and locking said at least one fastening means are provided on said at least one gripper head.

8. A transport mechanism according to claim 1, wherein said at least one fastening means is disengaged and locked by at least one of a thrusting, pulling and rotational movement.

9. A transport mechanism according to claim 1, wherein said formatting element has an engagement surface for said means for grasping and holding, with said engagement surface preferably being provided in the vicinity of said at least one fastening means.

10. A transport mechanism according to claim 9, wherein said engagement surface is embodied as a surface of a tapered sleeve or as an undercut surface.

11. A transport mechanism according to claim 1, wherein said means provided on said gripper head for grasping and holding are formed by at least two gripping jaws that are movable toward and away from one another symmetrically relative to an axis of said gripper head.

12. A transport mechanism according to claim 11, wherein said means for disengaging and locking includes a driver or coupling member that cooperates with a cooperating part of said at least one fastening means.

13. A transport mechanism according to claim 12, wherein said coupling member is surrounded by said at least two gripping jaws.

14. A transport mechanism according to claim 1, wherein said at least one fastening means is part of a rapid coupling.

15. A transport mechanism according to claim 1, wherein in addition to said at least one fastening means, means are provided for centering said formatting element on said at least one fastening means and on the respective functional part of said transport mechanism.

16. A transport mechanism according to claim 15, wherein said centering means is formed by projections and cooperating recesses.

17. A transport mechanism according to claim 1, wherein said gripper head is disposed on a carriage arrangement that is movable along a guide between said transporting zone and said means for the deposition and supply of formatting elements.

18. A transport mechanism according to claim 17, wherein said at least one drive means includes an adjustment drive means for moving said carriage arrangement along said guide, and also includes at least one further adjustment drive means for effecting at least one of the movements of lowering and pivoting said gripper head.

19. A transport mechanism according to claim 1, wherein said means for the deposition and supply of formatting elements is embodied in the manner of a table.

20. A transport mechanism according to claim 1, wherein said formatting elements are at least one of conveyor stars and guide members that form curved guide means.

21. A transport mechanism according to claim 1, which includes indicator means on said formatting elements, and scanning means provided on said at least one Gripper head for detecting said indicator means.

* * * * *